US010146956B2

(12) United States Patent
Boldyrev et al.

(10) Patent No.: US 10,146,956 B2
(45) Date of Patent: Dec. 4, 2018

(54) METHOD AND APPARATUS FOR PROVIDING LOCATION PRIVACY

(75) Inventors: Sergey Boldyrev, Söderkulla (FI); Ian Justin Oliver, Söderkulla (FI); Jari-Jukka Harald Kaaja, Järvenpää (FI); Mikko Aleksi Uusitalo, Helsinki (FI); Debmalya Biswas, Lausanne (CH); Juha Kalevi Laurila, St-Legier (CH)

(73) Assignee: Nokia Technologies Oy, Espoo (FI)

( * ) Notice: Subject to any disclaimer, the term of this patent is extended or adjusted under 35 U.S.C. 154(b) by 852 days.

(21) Appl. No.: 13/465,614

(22) Filed: May 7, 2012

(65) Prior Publication Data
US 2013/0298248 A1 Nov. 7, 2013

(51) Int. Cl.
| *G06F 7/04* | (2006.01) |
| *G06F 21/62* | (2013.01) |
| *H04W 12/02* | (2009.01) |
| *H04W 4/02* | (2018.01) |
| *H04L 29/06* | (2006.01) |

(52) U.S. Cl.
CPC ........ *G06F 21/6245* (2013.01); *H04W 4/025* (2013.01); *H04W 12/02* (2013.01); *G06F 2221/2111* (2013.01); *H04L 63/20* (2013.01)

(58) Field of Classification Search
CPC .... G06F 21/10; G06F 21/31; G11B 20/00086
USPC .................................................... 726/26–30
See application file for complete search history.

(56) References Cited

U.S. PATENT DOCUMENTS

| 8,024,111 | B1 | 9/2011 | Meadows et al. |
| 2004/0259574 | A1 | 12/2004 | Daniels et al. |
| 2007/0239840 | A1* | 10/2007 | Ishikawa ........................ 726/3 |
| 2007/0264974 | A1 | 11/2007 | Frank et al. |
| 2008/0070593 | A1 | 3/2008 | Altman et al. |
| 2008/0313736 | A1* | 12/2008 | Baum-Waidner et al. ..... 726/23 |
| 2009/0047972 | A1* | 2/2009 | Neeraj ...................... 455/456.1 |
| 2009/0319172 | A1* | 12/2009 | Almeida et al. ............. 701/201 |
| 2010/0009657 | A1 | 1/2010 | Dingler et al. |

(Continued)

FOREIGN PATENT DOCUMENTS

CN 102239488 11/2011

OTHER PUBLICATIONS

International Search Report for corresponding Application No. PCT/FI2013/050407 dated Aug. 7, 2013, 5 pages.

(Continued)

*Primary Examiner* — Anthony Brown
(74) *Attorney, Agent, or Firm* — Alston & Bird LLP

(57) ABSTRACT

An approach is provided for providing real-time controlled location privacy as the location evolves, and providing a user with alternate routes and applications depending on the level of desired location privacy. A location privacy platform determines at least one location associated with at least one device. The location privacy platform also processes and/or facilitates a processing of contextual information associated with the at least one location, the at least one device, one or more applications associated with the at least one device, or a combination thereof to determine one or more privacy metrics for the one or more applications with respect to the at least one location; wherein the one or more privacy metrics relate, at least in part, to an exposure of user data by the one or more applications at the at least one location.

18 Claims, 9 Drawing Sheets

(56) References Cited

U.S. PATENT DOCUMENTS

| | | |
|---|---|---|
| 2010/0146583 A1 | 6/2010 | Prehofer et al. |
| 2010/0241346 A1 | 9/2010 | Waris |
| 2011/0208417 A1* | 8/2011 | Fink .................. G01C 21/3676 |
| | | 701/532 |
| 2011/0239276 A1* | 9/2011 | Garcia Garcia et al. ......... 726/4 |
| 2012/0203663 A1* | 8/2012 | Sinclair et al. ............ 705/26.41 |
| 2013/0174211 A1 | 7/2013 | Aad et al. |

OTHER PUBLICATIONS

International Written Opinion for corresponding Application No. PCT/FI2013/050407 dated Aug. 7, 2013, 9 pages.

Barbeau, S. et al., "A Location-Aware Framework for Intelligent Real-Time Mobile Applications." IEEE Pervasive Computing, Jul.-Sep. 2011, vol. 10, No. 3, pp. 58-67, ISSN 1536-1268.

Extended European Search Report from corresponding European Patent Application No. 13786940.0, dated Dec. 2, 2015.

Office Action for corresponding Chinese Application No. 201380024010.2 dated Jul. 10, 2017, 12 pages.

Second Office Action for corresponding Chinese Application No. 2013800240102 dated Feb. 7, 2018, 7 pgs.

\* cited by examiner

300

METHOD AND APPARATUS FOR PROVIDING LOCATION PRIVACY

BACKGROUND

Service providers and device manufacturers (e.g., wireless, cellular, etc.) are continually challenged to deliver value and convenience to consumers by, for example, providing compelling network services. Mobile devices with various methods of connectivity are now becoming the primary gateway to various services provided via the Internet and also a major storage point for information. As the scope and variety of the available services (e.g., applications) increases, interoperability and combined use of these services becomes a major challenge. One example of service aggregation is providing location based services via mobile devices. In recent years, several services have become available that provide different types of location based information to the users of mobile devices. Some of the examples of location based services include augmented reality, augmented virtual reality, mapping, navigation, etc. Each of these services have their own specific server (e.g. on the Internet) that provides information associated with a specific location and orientation (such as points-of-interest, Wikipedia articles, etc.) and displays them to the user by a client application running on the mobile device. However, with the advent of location-aware services and applications on the mobile devices, location privacy is increasingly becoming relevant. On one hand, a user may be interested to benefit from the highly customized services offered by location-aware applications. On the other hand, the user may also be suspicious about the type of location information collected by the applications and their implications if misused by malicious applications.

SOME EXAMPLE EMBODIMENTS

Therefore, there is a need for an approach for providing real-time controlled location privacy as the location evolves, and providing a user with alternate routes and applications depending on the level of desired location privacy.

According to one embodiment, a method comprises determining at least one location associated with at least one device. The method also comprises processing and/or facilitating a processing of contextual information associated with the at least one location, the at least one device, one or more applications associated with the at least one device, or a combination thereof to determine one or more privacy metrics for the one or more applications with respect to the at least one location, wherein the one or more privacy metrics relate, at least in part, to an exposure of user data by the one or more applications at the at least one location.

According to another embodiment, an apparatus comprises at least one processor, and at least one memory including computer program code for one or more computer programs, the at least one memory and the computer program code configured to, with the at least one processor, cause, at least in part, the apparatus to determine at least one location associated with at least one device. The apparatus is also caused to process and/or facilitate a processing of contextual information associated with the at least one location, the at least one device, one or more applications associated with the at least one device, or a combination thereof to determine one or more privacy metrics for the one or more applications with respect to the at least one location, wherein the one or more privacy metrics relate, at least in part, to an exposure of user data by the one or more applications at the at least one location.

According to another embodiment, a computer-readable storage medium carries one or more sequences of one or more instructions which, when executed by one or more processors, cause, at least in part, an apparatus to determine at least one location associated with at least one device. The apparatus is also caused to process and/or facilitate a processing of contextual information associated with the at least one location, the at least one device, one or more applications associated with the at least one device, or a combination thereof to determine one or more privacy metrics for the one or more applications with respect to the at least one location, wherein the one or more privacy metrics relate, at least in part, to an exposure of user data by the one or more applications at the at least one location.

According to another embodiment, an apparatus comprises means for determining at least one location associated with at least one device. The apparatus also comprises means for processing and/or facilitating a processing of contextual information associated with the at least one location, the at least one device, one or more applications associated with the at least one device, or a combination thereof to determine one or more privacy metrics for the one or more applications with respect to the at least one location, wherein the one or more privacy metrics relate, at least in part, to an exposure of user data by the one or more applications at the at least one location.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 1-10, 21-30, and 46-48.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing real-time controlled location privacy are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
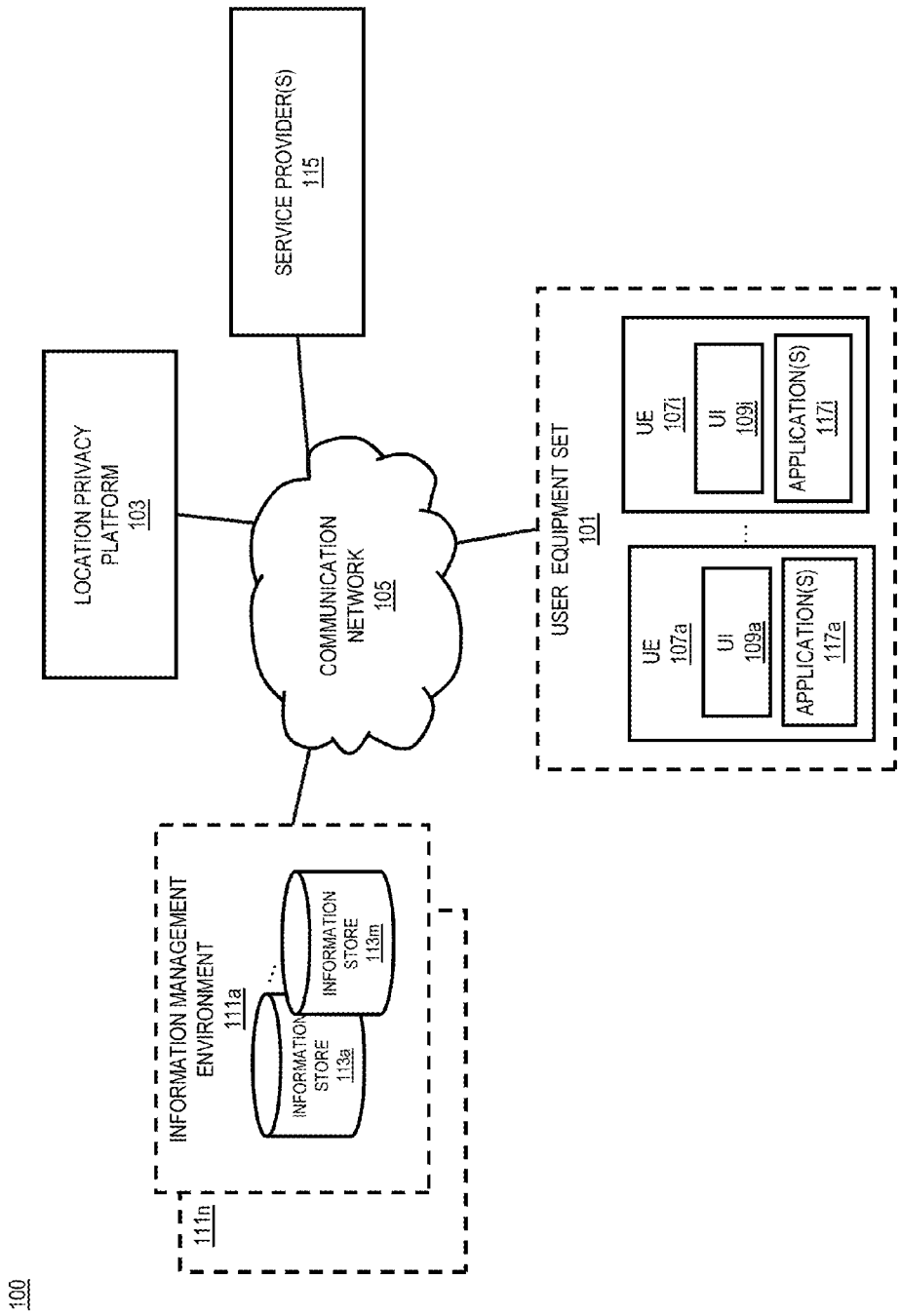
FIG. 1 is a diagram of a system capable of providing real-time controlled location privacy, according to one embodiment.

FIG. 1 is a diagram of a system capable of providing real-time controlled location privacy, according to one embodiment. Privacy of location data collected by mobile applications such as, for example, smart phone applications, has recently become the focus of intense scrutiny by consumers, researchers, regulators, developers, etc. However, current solutions and proposals only consider controlling user location data access by smart phone applications.

Typically, a user of a mobile device is given the option of statically configuring his or her location access, for example, via a control panel specifying access rights (allow, deny, etc.) for different applications. In this case, it is up to the mobile operation system (OS) platform to ensure that the user settings are adhered to at run-time. This approach has certain inherent drawbacks which prevent it from becoming a comprehensive solution.

In one embodiment, a user may not have sufficient knowledge needed to decide how much access to his or her location information and under what conditions should be given to each application. The user may need to have information about the access patterns of an application in order to be able to make a decision on a level for his or her location information access by the application. However, the application access pattern information is not typically readily available to mobile device users.

In one embodiment, determining the privacy implications of location access by applications is non-trivial. The actual privacy impact of location access may depend on a number of factors such as, for example, the underlying algorithm used (GPS, Wi-Fi triangulation, etc.) and in turn, determining the accuracy of data returned, frequency of access, anonymity provided by surroundings, etc. Therefore, privacy metrics are needed to quantify privacy implications of access to location information, and to present them to the user in a user-friendly fashion. Furthermore, for a user to be able to effectively decide on awarding location access to applications, the applications location access patterns and their privacy implications should be presented to the user in real-time, as user location evolves. This requires efficient storage and delivery infrastructure for the information to be presented in real-time.

To address this problem, a system 100 of FIG. 1 introduces the capability to provide real-time controlled location privacy. In one embodiment, effective control of location privacy by the location privacy platform 103 includes providing value added services such as, for example, recommending privacy-safe paths, applications, policies, etc., for performing the necessary data transformation needed to achieve the desired level of privacy. For example, under the various embodiments discussed herein, location privacy may be offered asymmetrically or symmetrically depending on factors such as the user and/or content of interest.

In one embodiment, the location privacy platform 103 determines a set of privacy metrics based on various factors such as, for example, history of applications and their access to information including location information, user preferences determined by users of UEs 107a-107i, the environment surrounding the UEs 107a-107i, etc. In some embodiments, the privacy metrics may also take into account the connectivity providers or connectivity methods (e.g., cognitive connectivity, near field communications (NFC)/radio frequency identification (RFID), radio frequency (RF) memory tags, wireless memory connectivities, etc.) used for providing connectivity between the UEs 107a-107i, service provider(s) 115, information management environments 111a-111n, or a combination thereof. It is noted that the privacy metrics can be stored on a local storage on UEs 107a-107i, on a storage on the location privacy platform 103, on the information management environments 111a-111n, or a combination thereof. In some embodiments, the connectivity method or solution used may also be used to determine a storage location of the privacy metrics.

In one embodiment, as the location of UEs 107a-107i evolves (e.g., the user carrying the UE moves from location to location) a real-time display of privacy related information associated with each of the location-aware application(s) 117a-117i is provided to the user, for example via a user interface (UI) 109a-109i. The provided real-time privacy related information enables the user of UEs 107a-107i to control their location privacy by controlling access to their location by any of the location-aware application(s) 117a-117i at any time. For example, a user may be enabled by the location privacy platform 103 to apply data transformations on the location data before the data is made available to application(s) 117a-117i.

In one embodiment, the location privacy platform 103 employs various methods for efficient display, storage and delivery mechanisms for presenting the location privacy related information for various application(s) 117a-117i to the UEs 107a-107i in real-time.

In one embodiment, the location privacy platform 103 provides location privacy related recommendation services to the users of UEs 107a-107i. The recommendations may include, for example, recommending a privacy-safe travelling paths including route detours to preserve privacy, recommending privacy-safe applications on a given travel path or route, recommending alternate privacy-safe applications in the event of preferred or installed applications being unsafe, recommending policies that provide or enforce a desired level of privacy, or a combination thereof.

In one embodiment, the location privacy platform 103 collects location data from the UEs 107a-107i. The location privacy platform 103 uses the collected location data for making inferences about location privacy usage of location-aware application(s) 117a-117i. The location privacy platform 103 may collect various location related data items such as, for example, timestamp (the date and time when the data was collected), data source type (methods used for determining data, GPS based methods, non-GPS based methods, etc.), accuracy (level of accuracy of the collected location data), applications accessing the data, etc.

In one embodiment, the location privacy platform 103 uses different sources for location data collection. For example, the location data may be voluntarily provided by the application(s) 117a-117i that access the location data. It is noted that, although the voluntary sharing of the location data may be impractical to assume for third party application(s) 117a-117i, however, application(s) 117a-117i that have been pre-installed on UEs 107a-107i at manufacturing stage, or privacy-friendly application(s) 117a-117i which promote their privacy-friendliness may easily share the location data with the location privacy platform 103.

In one embodiment, in addition to the location data provided by the application(s) 117a-117i, the location privacy platform 103 may intercept access requests such as Application Programming Interface (API) invocations, at the middleware API level. It is noted that most of the application(s) 117a-117i relay on a middleware framework such as, for example, Qt API®, Windows Phone SDK®, etc., for accessing UE 107a-107i resources including location data. In this embodiment, the location privacy platform 103 may enable logging services for the location based APIs so that request details from application(s) 117a-117i are logged whenever an application 117a-117i invokes the location based APIs to access location data. Additionally, the interception and logging can be also performed at lower system levels such as, for example, the Operation System (OS) level, driver level, etc.

In one embodiment, the location privacy platform 103 utilizes the privacy metrics to quantify the privacy impact of location data being acquired by one or more application(s) 117a-117i. In this embodiment, the data recorded by the location privacy platform 103 is used for determining the privacy impact of application(s) 117a-117i reading data representing a location L. The privacy impact can be expressed as a function $F(a, s, e, h)$ of the parameters a (representing accuracy of location data acquired), s (user sensitiveness to location L, users are expected to be more sensitive to certain locations, such as their home, office, children's school, etc.), e (surrounding, environmental parameters such as level of anonymity offered by location L), and h (behavioral history of application(s) 117a-117i including frequency of access, prior knowledge of location L, any malicious behavior detected in the past based on feedback from user, feedbacks of other users collected in a crowdsourcing fashion, etc.). It is noted that the level of anonymity (parameter e) offered by a location L, and the privacy impact of location L are in an opposing relation meaning that the higher the level of anonymity offered by a location, the lower is its privacy impact.

In one embodiment, the accuracy of the location data (parameter a) may depend on the connectivity methods the UE 107a-107i are using. For example, if a UE 107a-107i is using white space database provided spectrum, the UE 107a-107i should report its location to the database with certain accuracy. On the other hand, some connectivity methods such as hotspots in homes, restaurants, etc., are provided locally. As another example, touch-distance connectivity (e.g., NFC/RFID, RF memory tags, short range wireless, etc.) are very local and often have high accuracy because connectivity is provided with touch to a predetermined point or location. The local connectivity methods may also relate to the level of anonymity. For example, if a UE 107a-107i is connected over a private Wireless Local Area Network (WLAN) the UE can be easily identified via the WLAN.

In some embodiments, the locality of a connectivity method (e.g., a distance over which the connectivity method operates can determine the privacy levels used by the location privacy platform 103. For example, touch-distance radios or connectivity methods can be very local, having ranges of a few centimeters, thereby limiting or potential privacy concerns. In other cases, the connectivity method may have longer ranges, which may create other privacy concerns that can be addressed by different levels of privacy enforcement by the platform 103.

In one embodiment, the privacy implications of location data sharing can be presented to the user of UE 107a-107i via user-friendly UI 109a-109i. The implications may be abstracted to graphical icons, for user to easily discover and compare the implications.

Even though many users may not have any interest in receiving the privacy implications information, in one embodiment, the location privacy platform 103 enables a user of UE 107a-107i to determine an overall desired level of privacy for all of the application(s) 117a-117i, individual levels of privacy for each application 117a-117i, or a combination thereof. The setting by the users can be done once for the life of the UE 107a-107i, revised periodically, occasionally, or a combination thereof.

Additionally, in one embodiment, the user of UE 107a-107i may want to define privacy levels for groups of application(s) 117a-117i based on the type of data the applications access, the type of service the application provide, the type of technology the applications are based on, or a combination thereof.

As shown in FIG. 1, the system 100 comprises a set 101 of user equipment (UEs) 107a-107i having connectivity to the location privacy platform 103 via a communication network 105. By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, NFC/RFID, RF memory tags, touch-distance radios, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UEs 107a-107i are any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UEs 107a-107i can support any type of interface to the user (such as "wearable" circuitry, etc.).

By way of example, the UEs 107a-107i, and the location privacy platform 103 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
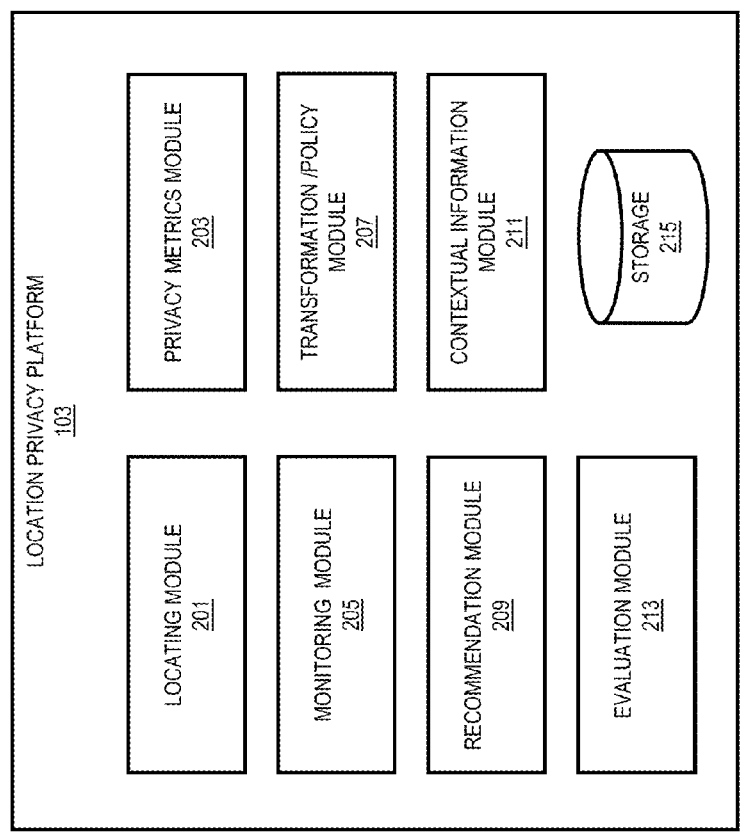
FIG. 2 is a diagram of the components of a location privacy platform, according to one embodiment.

FIG. 2 is a diagram of the components of a location privacy platform, according to one embodiment. By way of example, the location privacy platform 103 includes one or more components for providing real-time controlled location privacy. It is contemplated that the functions of these components may be combined in one or more components or performed by other components of equivalent functionality. In this embodiment, the location privacy platform includes a location module 201, a privacy metrics module 203, a monitoring module 205, a transformation/policy module 207, a recommendation module 209, a contextual information module 211, an evaluation module 213, and a storage 215.

In one embodiment, the location module 201 determines the location of UEs 107a-107i. The location module 201 may determine the location in real-time and refresh the location information as the users carrying the UEs 107a-107i are on the move. The real-time location information enables the location module 201 to keep track of the travel path for each UE 107a-107i. Furthermore, the location module 201 may be located on the UEs 107a-107i, collect location information associated with each UE 107a-107i, and transmit the collected information to the location privacy platform 103.

In one embodiment, the privacy metrics module 203 determines privacy metrics associated with each UE 107a-107i and each application 117a-117i, where privacy metrics represent privacy implications that each application 117a-117i may have on the UEs 107a-107i location privacy. The privacy metrics module 203 may determine privacy metrics based on various contextual information such as, for example, history of application(s) 117a-117i (with regards to a specific UE 107a-107i, with regards to a group of UEs 107a-107i, or a combination thereof); user preferences determined by users of UEs 107a-107i and stored on the UEs, or information stores 113a-113m, or a combination thereof; environmental information (information about the area surrounding the UEs 107a-107i); connectivity methods offered and used by service provider(s) 115 for connecting the UEs 107a-107i to the communication network 105; or a combination thereof.

In one embodiment, the monitoring module 205 monitors the location of UEs 107a-107i and the contextual information associated with the UEs 107a-107i, in real-time, periodically, based on a pre-determined schedule, based on demands from one or more UEs 107a-107i, based on demands from the privacy metrics module 203, or a combination thereof. The privacy metrics module 203 uses the collected information via the monitoring module 205 for determining the privacy metrics.

In one embodiment, the transformation/policy module 207 transforms user data at the determined locations. The user data transformation may include encrypting the user data using various cryptography methods in order to prevent unauthorized access to the data by any of the application(s) 117a-117i. The transformation/policy module 207 may also provide one or more policies determined by the manufacturers of UEs 107a-107i, by the service provider(s) 115, by users of the UEs 107a-107i, or a combination thereof, for determining one or more threshold values for the privacy metrics with respect to each application 117a-117i.

In one embodiment, the recommendation module 209, processes the determined privacy metrics and provides recommended travel paths from one location to another location to the UEs 107a-107i, wherein the recommended paths include route detours to preserve location privacy. Alternatively, the recommendation module 209 may recommend applications for use on a path that a UE 107a-107i is traveling on. For example, in some embodiments there may not be any alternate paths available that can preserve the privacy in a desired level. In these embodiments, the path can be kept unchanged while the recommendation module 209 can recommend an alternate set of application(s) 117a-117i that are not threatening to the location privacy of UEs 107a-107i.

In one embodiment, the contextual information module 211 provides the contextual information used by the privacy metrics module 203 for determining the privacy metrics. The contextual information may include information about sources of data associated with users of UEs 107a-107i, accuracy of the data, uses of the data, or a combination thereof.

In one embodiment, the evaluation module 213 evaluates the privacy metrics determined by the privacy metrics module 203 against threshold values. The threshold values may represent the lowest tolerable levels of location privacy for the UEs 107a-107i and can be determined as part of the policies by the manufacturers of UEs 107a-107i, by the service provider(s) 115, by users of the UEs 107a-107i, or a combination thereof.

In one embodiment, the location privacy platform 103 stores the data used or produced buy any of its components 201-211 in storage 215, in information stores 113a-113m, on local storages of UEs 107a-107i, or a combination thereof.

Figure 3A:
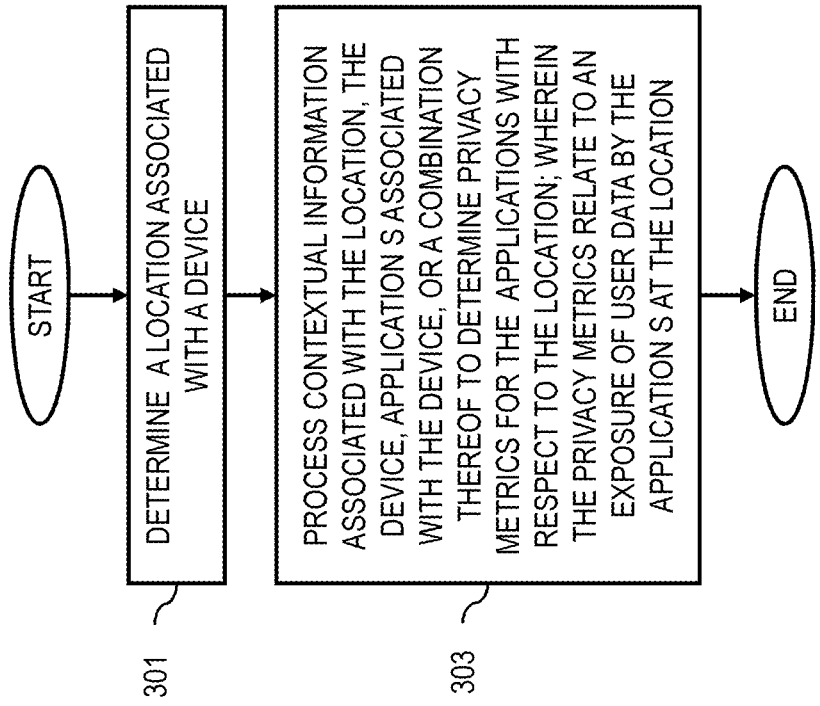
FIGS. 3A-3B are flowcharts of a process for providing real-time controlled location privacy, according to one embodiment.
Figure 3B:
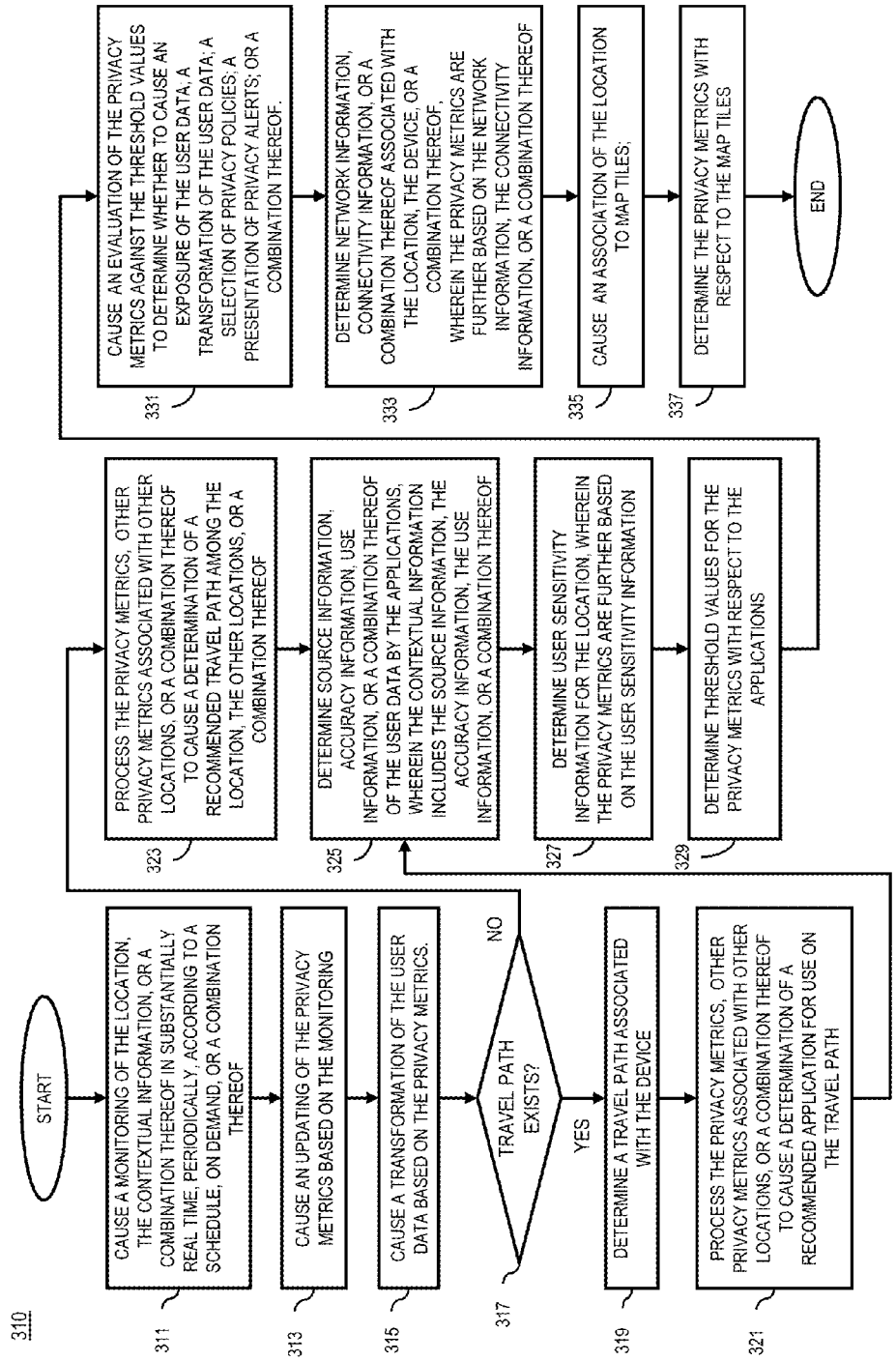
Figure 6:
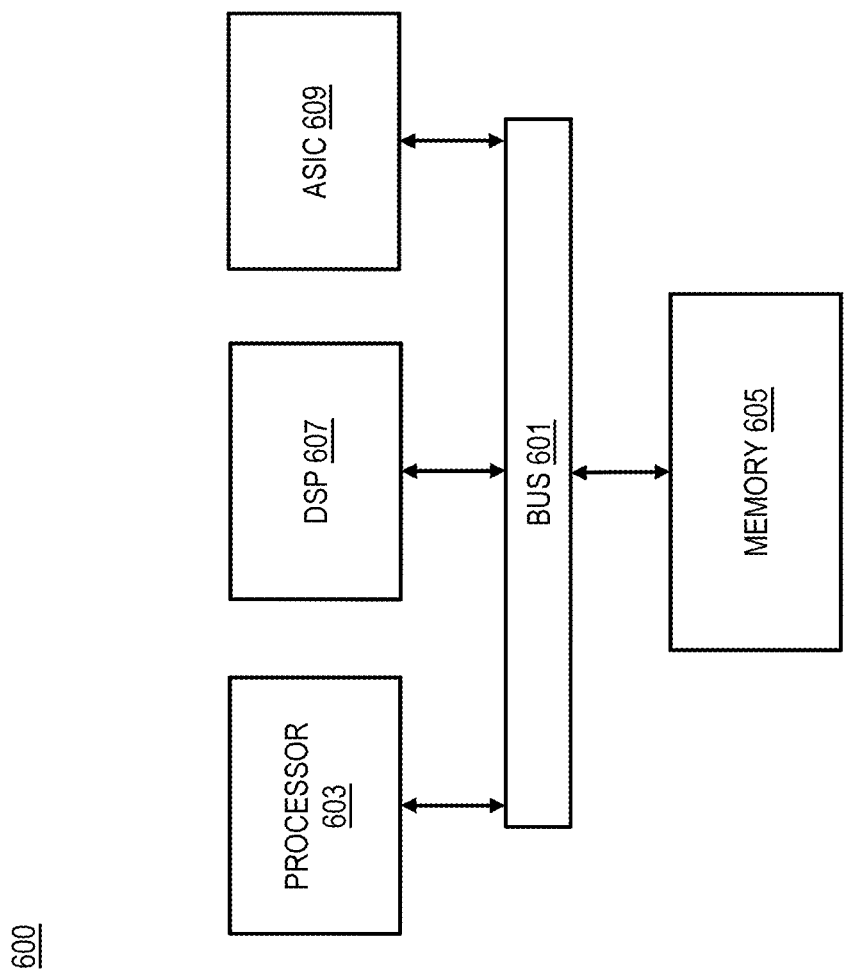
FIG. 6 is a diagram of a chip set that can be used to implement an embodiment of the invention.

FIGS. 3A-3B are flowcharts of a process for providing real-time controlled location privacy, according to one embodiment. In one embodiment, the location privacy platform 103 performs the processes 300 and 310 and is implemented in, for instance, a chip set including a processor and a memory as shown in FIG. 6. In one embodiment, in step 301 of flowchart 300 in FIG. 3A, the location module 201 determines at least one location associated with at least one UE 107a-107i. The at least one location may represent, the current location, a previous location, one or more next destination locations, or a combination thereof.

In one embodiment, per step 303 of FIG. 3A, the privacy metrics module 203 processes and/or facilitates a processing of contextual information associated with the at least one location, the at least one UE 107a-107i, one or more application(s) 117a-117i associated with the at least one UE, or a combination thereof to determine one or more privacy metrics for the one or more application(s) 117a-117i with respect to the at least one location. The one or more privacy metrics determined by the privacy metrics module 203 relate, at least in part, to an exposure of user data of a UE 107a-107i by the one or more application(s) 117a-117i at the at least one location. The contextual information associated with the at least one location FIG. 3B is a flowchart of a process for determining the privacy metrics, according to one embodiment. In one embodiment, per step 311 of flowchart 310 of FIG. 3B, the monitoring module 205 causes, at least in part, a monitoring of the at least one location, the contextual information, or a combination thereof in substantially real-time, periodically, according to a schedule, on demand (demanded by a user of UE 107a-107i, by service provider(s) 115, or a combination thereof), or a combination thereof. The contextual information may include application(s) 117a-117i history, preferences of users of UEs 107a-107i, environmental factors surrounding the UEs 107a-107i such as, for example, the connectivity method used by the UEs 107a-107i to connect to the communication network 105, or a combination thereof. The monitoring module 205 may record various events such as, for example, changes in UE 107a-107i location, user preferences updates, changes in connectivity methods by the service provider(s) 115, application updates, etc., or a combination thereof, together with timestamps of each event, source of changes or updates, or a combination thereof. Additionally, the monitoring data may be stored in storage 215, in the information management environment 111a-111n or a combination thereof. In some embodiments, the monitoring may include obtaining data from external sources (e.g., sources other than the UEs 107a-107i such as the service providers 115 or any other source available over the communication network 105. In addition, the data or information collected during monitoring (e.g., from the UEs 107a-107i or from external sources) can then be stored or uploaded to a centralized resource. In one use case, the centralized resource can be, for instance, a mapping service that receives monitored information or data to update or improve its mapping database.

In one embodiment, per step 313 of FIG. 3B, the privacy metrics module 203 causes, at least in part, an updating of the one or more privacy metrics based, at least in part, on the recorded monitoring results. For example, if a user of a UE 107a updates preferences regarding location access by an application, or a group of application(s) 117a-117i, the privacy metrics module 203 updates privacy metrics associated with application(s) 117a-117i with regards to the UE 107a.

In one embodiment, per step 315 of FIG. 3B, the transaction/policy module 207 causes, at least in part, a transformation of the user data based, at least in part, on the one or more privacy metrics, in order to achieve the desired level of privacy. For example, the transaction/policy module 207 may transforming the location data of UE 107a-107i with respect to its accuracy (e.g. by anonymizing or encrypting it further, by abstracting GPS co-ordinates to city level, etc.) before returning the data.

In one embodiment, per step 317 of FIG. 3B, the recommendation module 209 determines whether or not a travel path for a UE 107a-107i has been already determined. For example, a user may strongly prefer to travel on a certain path, or take a certain route to work. If at least one travel path has been determined, per step 319 of FIG. 3B the location module 201 determines the at least one travel path associated with the at least one UE 107a-107i.

Subsequently, per step 321 of FIG. 3B, the recommendation module 209 processes and/or facilitates a processing of the one or more privacy metrics determined by the privacy metrics module 203, one or more other privacy metrics associated with one or more other locations, or a combination thereof to cause, at least in part, a determination of at least one recommended application 117a-117i (privacy-safe application) for use on the at least one determined travel path.

Alternatively, in one embodiment, if per step 317 of FIG. 3B no pre-determined travel paths is detected, per step 323 the recommendation module 209 processes and/or facilitates a processing of the one or more privacy metrics determined by the privacy metrics module 203, one or more other privacy metrics associated with one or more other locations, or a combination thereof to cause, at least in part, a determination of at least one recommended travel path (privacy-safe path) among the at least one location, the one or more other locations, or a combination thereof. The recommendation module 209 may determine the recommended travel paths, the recommended applications, or a combination thereof based, at least in part, on current location, other locations (e.g., destinations), the contextual information, or a combination thereof.

In one embodiment, per step 325 of FIG. 3B, the contextual information module 211 determines source information, accuracy information, use information, or a combination thereof of the user data of UEs 107a-107i by the one or more application(s) 117a-117i, wherein the contextual information includes, at least in part, the source information, the accuracy information, the use information, or a combination thereof. The determined contextual information is used by the privacy metrics module 203 for determining the privacy metrics.

In one embodiment, per step 327 of FIG. 3B, the privacy metrics module 203 determines user sensitivity information for UEs 107a-107i for the at least one location, wherein the one or more privacy metrics are further based, at least in part, on the user sensitivity information. The user sensitivity may indicate the importance of privacy of certain locations for a user of UEs 107a-107i. For example, home and children's school may have higher sensitivity associated to them than work place. In one embodiment, this place sensitivity can also be used to suggest or present the importance of privacy for a particular and/or user.

In one embodiment, per step 329 of FIG. 3B, the privacy metrics module 203 determines one or more threshold values for the one or more privacy metrics with respect to the one or more application(s) 117a-117i. The threshold values may indicate the highest or lowest acceptable or tolerable levels for the metrics. The threshold values may be determined based, at least in part, on settings determined by users, manufacturers, service providers, or a combination thereof.

In one embodiment, per step 331 of FIG. 3B, the evaluation module 213 causes, at least in part, an evaluation of the one or more privacy metrics against the one or more threshold values. The evaluation result can be used to determine whether to cause, at least in part, an exposure of the user data (by the privacy metrics module 203), a transformation of the user data (by the transformation/policy module 207), a selection of one or more privacy policies (by the transformation/policy module 207), a presentation of one or more privacy alerts (by the monitoring module 205), or a combination thereof.

In one embodiment, the privacy metrics module 203 determines network information associated with the communication network 105, connectivity information provided by the communication network 105 or by the service provider(s) 115, or a combination thereof associated with the at least one location, the at least one UE 107a-107i, or a combination thereof, wherein the one or more privacy metrics determined by the privacy metrics module 203 are further based, at least in part, on the network information, the connectivity information, or a combination thereof.

In one embodiment, per step 335 of FIG. 3B, the privacy metrics module 203 causes at least in part, an association of the at least one location to one or more map tiles, wherein the maps tiles are created by cutting a map into tiles for quick retrieval and display. Subsequently, per step 337 of FIG. 3B, the privacy metrics module 203 determines the one or more privacy metrics with respect to the one or more map tiles, such that a set of privacy metrics is assigned to each map tile and is used for providing location privacy for UEs 107a-107i traveling in the area represented by the tiled map.

Figure 4A:
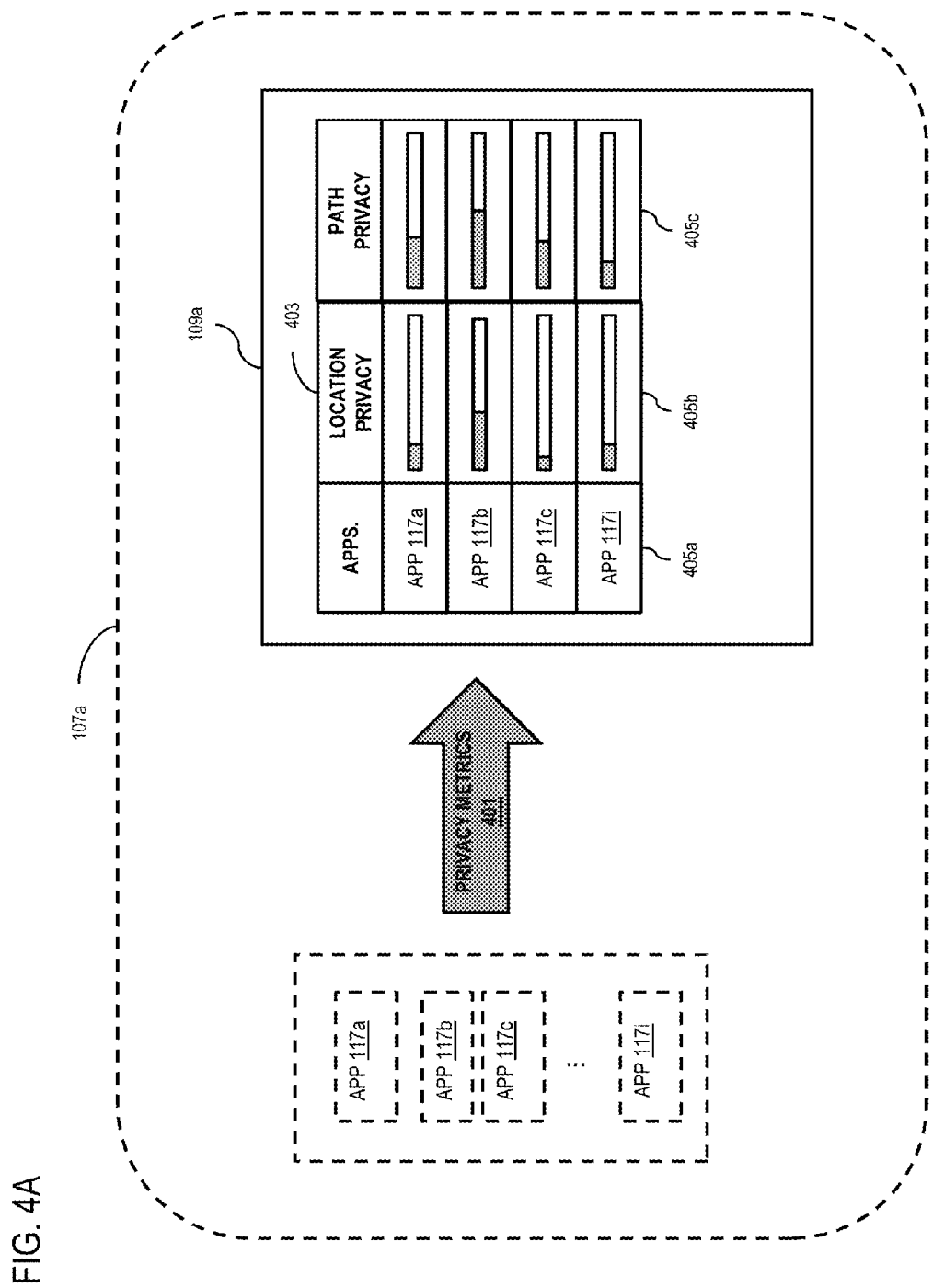
FIGS. 4A-4B are diagrams of utilization and presentation of privacy impact of applications, according to various embodiments.
Figure 4B:
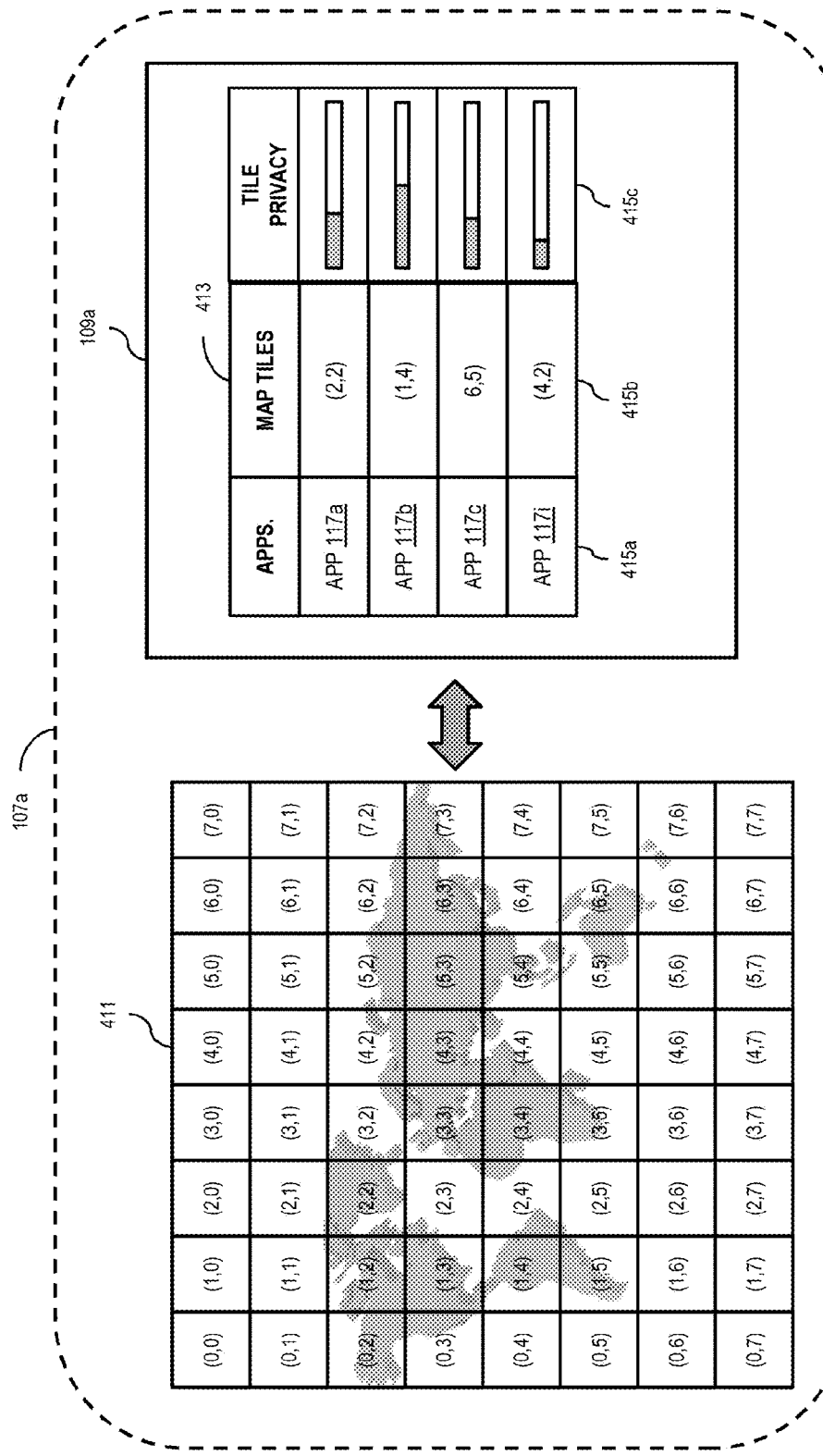

FIGS. 4A-4B are diagrams of utilization and presentation of privacy impact of applications, according to various embodiments. In one embodiment, as seen in FIG. 4A, the privacy metrics 401 provided by the location privacy platform 103 provide information about the privacy impacts of various application(s) 117a-117i to the user of UE 107a.

In one embodiment, the privacy impacts of application(s) 117a-117i may be presented to the user of UE 107a as a table 403 made of columns 405a, 405b, and 405v on a UI 109a, wherein column 405a shows applications, column 405b shows the amount of impact of each application from column 405a on the location privacy of UE 107a, and column 405c shows the amount of impact of each application from column 405a on the privacy of a travelling path that is currently selected by the user of UE 107a (e.g., via a driving direction using a GPS service application).

In one embodiment, the user of UE 107a can use the information displayed in table 403 to control the location data that will be available to different application(s) 117a-117i, for example, by setting the acceptable location privacy level for each application. The user settings can be expressed and maintained as privacy rules which are enforced by the location privacy platform 103. The location privacy platform 103 may restrict the application(s) 117a-117i to location data not exceeding the set privacy threshold levels, determined by based on the privacy metrics.

In one embodiment, the location privacy platform 101 may enforce the location privacy by denying/blocking further access to location data as soon as the acceptable limit is reached. In another embodiment, the location privacy platform 103 may transform the location with respect to its accuracy by anonymizing the data further, for example, by abstracting GPS co-ordinates to city level, before returning the data.

In yet another embodiment, the location privacy platform 103 can recommend a path detour that offers better anonymization, or is farther away from user's sensitive locations.

In one embodiment, as seen in FIG. 4B, the privacy levels for portions of a map 411 with respect to different application(s) 117a-117i can be pre-computed and cached, for example on the UE 107a, in storage 215, or a combination thereof, for easy access at run-time. The portions of map 411 may be determined by tiling the map into squares in equal sizes (as seen in FIG. 4B), into geographic divisions (e.g., countries, regions, cities, roads, buildings, etc.), or a combination thereof.

In the embodiment of FIG. 4B, the display 413 on UI 109a shows a list 415a of application(s) 117a-117i, a list 415b of map tiles from map 411, and for each map tile a level of tile privacy 415c.

As previously discussed, the privacy metrics for a UE 107a-107i in a location L can be expressed as a function F (a, s, e, h) of the parameters a (representing accuracy of location data acquired), s (user sensitiveness to location L), e (surrounding, environmental parameters such as level of anonymity offered by location L), and h (behavioral history of application(s) 117a-117i). It is noted that the parameter a is a real-time parameter but parameters s, e, and h are static parameters. In one embodiment, the privacy levels for portions of a map with respect to different application(s) 117a-117i can be pre-computed and cached, for example on the UE 107a, in storage 215, or a combination thereof, for easy access at run-time.

In one embodiment, the location privacy platform 103 may compute a privacy-safe path for a UE 107a-107i such that a set of location-aware application(s) 117a-117i can be used by the UE 107a-107i while travelling on the privacy-safe path without violating user privacy.

In one embodiment, the location privacy platform 103 may provide the UE 107a-107i with lists of privacy-safe and privacy-unsafe location-aware application(s) 117a-117i while the UE 107a-107i is travelling on a determined path.

In yet another embodiment, the location privacy platform 103 recommends alternate privacy-safe application(s) 117a-117i to the UE 107a-107i, when a travelling path and a preferred set of location-aware application(s) 117a-117i are pre-determined (e.g. by a user of UE 107a-107i), and the location privacy platform 103 determines that some or all of the preferred applications are privacy-unsafe. In this embodiment, the recommended alternate applications have same functionalities of the preferred application. Additionally, the location privacy platform 103 may modify user privacy settings while providing similar privacy levels to the UEs 107a-107i.

In one embodiment, privacy related information, including pre-determined levels of privacy, can be displayed on UI 109a or stored (e.g., on a local memory of UE 107a-107i, on storage 215, in the information management environment 111a-111n, or a combination thereof) corresponding to map tiles of map 411 with the data cached at a nearest Content Delivery Network (CDN), for example, within the environment of the communication network 105.

It is noted that, since short range communication is mostly bounded with physical objects and exposes features just-in-place, it enables bidirectional mechanisms for adjustment of privacy settings cached with the CDSs. The mechanism works in finer manner over the privacy settings for a particular location (e.g., right here, right now).

Additionally, mid-range communication, particularly Cognitive Radio (CR), can shape the privacy settings in a coarser manner, since the CR has knowledge from coexistence managers and regional databases about what type and which bandwidth can be used to establish a link. Similarly, the privacy settings can be influenced by how this decision making is done.

The processes described herein for providing real-time controlled location privacy may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 5:
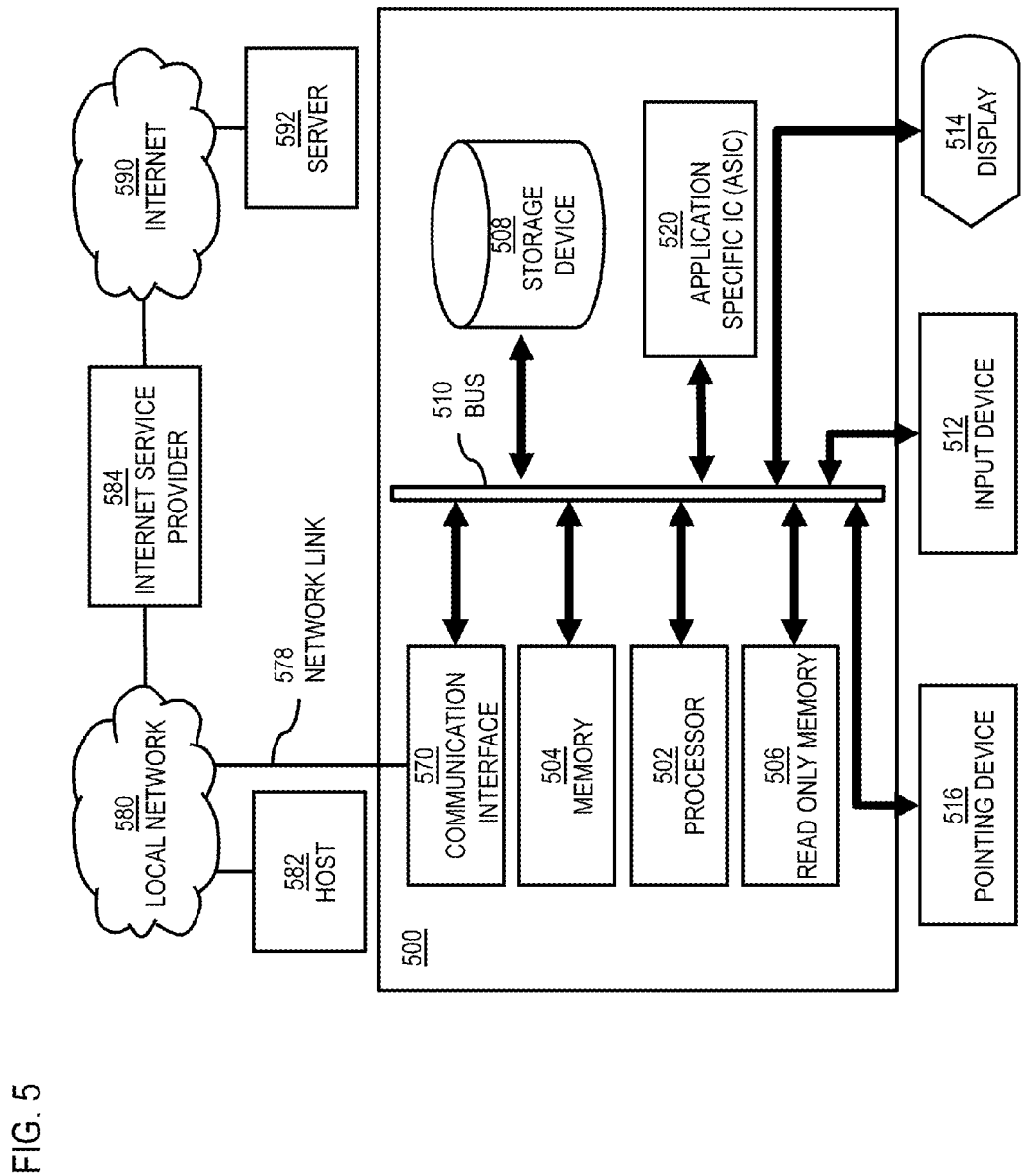
FIG. 5 is a diagram of hardware that can be used to implement an embodiment of the invention.

FIG. 5 illustrates a computer system 500 upon which an embodiment of the invention may be implemented. Although computer system 500 is depicted with respect to a particular device or equipment, it is contemplated that other devices or equipment (e.g., network elements, servers, etc.) within FIG. 5 can deploy the illustrated hardware and components of system 500. Computer system 500 is programmed (e.g., via computer program code or instructions) to provide real-time controlled location privacy as described herein and includes a communication mechanism such as a bus 510 for passing information between other internal and external components of the computer system 500. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 500, or a portion thereof, constitutes a means for performing one or more steps of providing real-time controlled location privacy.

A bus 510 includes one or more parallel conductors of information so that information is transferred quickly among devices coupled to the bus 510. One or more processors 502 for processing information are coupled with the bus 510.

A processor (or multiple processors) 502 performs a set of operations on information as specified by computer program code related to providing real-time controlled location privacy. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 510 and placing information on the bus 510. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 502, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 500 also includes a memory 504 coupled to bus 510. The memory 504, such as a random access memory (RAM) or any other dynamic storage device, stores information including processor instructions for providing real-time controlled location privacy. Dynamic memory allows information stored therein to be changed by the computer system 500. RAM allows a unit of information stored at a location called a memory address to be stored and retrieved independently of information at neighboring addresses. The memory 504 is also used by the processor 502 to store temporary values during execution of processor instructions. The computer system 500 also includes a read only memory (ROM) 506 or any other static storage device coupled to the bus 510 for storing static information, including instructions, that is not changed by the computer system 500. Some memory is composed of volatile storage that loses the information stored thereon when power is lost. Also coupled to bus 510 is a non-volatile (persistent) storage device 508, such as a magnetic disk, optical disk or flash card, for storing information, including instructions, that persists even when the computer system 500 is turned off or otherwise loses power.

Information, including instructions for providing real-time controlled location privacy, is provided to the bus 510 for use by the processor from an external input device 512, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 500. Other external devices coupled to bus 510, used primarily for interacting with humans, include a display device 514, such as a cathode ray tube (CRT), a liquid crystal display (LCD), a light emitting diode (LED) display, an organic LED (OLED) display, a plasma screen, or a printer for presenting text or images, and a pointing device 516, such as a mouse, a trackball, cursor direction keys, or a motion sensor, for controlling a position of a small cursor image presented on the display 514 and issuing commands associated with graphical elements presented on the display 514. In some embodiments, for example, in embodiments in which the computer system 500 performs all functions automatically without human input, one or more of external input device 512, display device 514 and pointing device 516 is omitted.

In the illustrated embodiment, special purpose hardware, such as an application specific integrated circuit (ASIC) 520, is coupled to bus 510. The special purpose hardware is configured to perform operations not performed by processor 502 quickly enough for special purposes. Examples of ASICs include graphics accelerator cards for generating images for display 514, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 500 also includes one or more instances of a communications interface 570 coupled to bus 510. Communication interface 570 provides a one-way or two-way communication coupling to a variety of external devices that operate with their own processors, such as printers, scanners and external disks. In general the coupling is with a network link 578 that is connected to a local network 580 to which a variety of external devices with their own processors are connected. For example, communication interface 570 may be a parallel port or a serial port or a universal serial bus (USB) port on a personal computer. In some embodiments, communications interface 570 is an integrated services digital network (ISDN) card or a digital subscriber line (DSL) card or a telephone modem that provides an information communication connection to a corresponding type of telephone line. In some embodiments, a communication interface 570 is a cable modem that converts signals on bus 510 into signals for a communication connection over a coaxial cable or into optical signals for a communication connection over a fiber optic cable. As another example, communications interface 570 may be a local area network (LAN) card to provide a data communication connection to a compatible LAN, such as Ethernet. Wireless links may also be implemented. For wireless links, the communications interface 570 sends or receives or both sends and receives electrical, acoustic or electromagnetic signals, including infrared and optical signals, that carry information streams, such as digital data. For example, in wireless handheld devices, such as mobile telephones like cell phones, the communications interface 570 includes a radio band electromagnetic transmitter and receiver called a radio transceiver. In certain embodiments, the communications interface 570 enables connection to the communication network 105 for providing real-time controlled location privacy to the UEs 107a-107i.

The term "computer-readable medium" as used herein refers to any medium that participates in providing information to processor 502, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 508. Volatile media include, for example, dynamic memory 504. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 520.

Network link 578 typically provides information communication using transmission media through one or more networks to other devices that use or process the information. For example, network link 578 may provide a connection through local network 580 to a host computer 582 or to equipment 584 operated by an Internet Service Provider (ISP). ISP equipment 584 in turn provides data communication services through the public, world-wide packet-switching communication network of networks now commonly referred to as the Internet 590.

A computer called a server host 592 connected to the Internet hosts a process that provides a service in response to information received over the Internet. For example, server host 592 hosts a process that provides information representing video data for presentation at display 514. It is contemplated that the components of system 500 can be deployed in various configurations within other computer systems, e.g., host 582 and server 592.

At least some embodiments of the invention are related to the use of computer system 500 for implementing some or all of the techniques described herein. According to one embodiment of the invention, those techniques are performed by computer system 500 in response to processor 502 executing one or more sequences of one or more processor instructions contained in memory 504. Such instructions, also called computer instructions, software and program code, may be read into memory 504 from another computer-readable medium such as storage device 508 or network link 578. Execution of the sequences of instructions contained in memory 504 causes processor 502 to perform one or more of the method steps described herein. In alternative embodiments, hardware, such as ASIC 520, may be used in place of or in combination with software to implement the invention. Thus, embodiments of the invention are not limited to any specific combination of hardware and software, unless otherwise explicitly stated herein.

The signals transmitted over network link 578 and other networks through communications interface 570, carry information to and from computer system 500. Computer system 500 can send and receive information, including program code, through the networks 580, 590 among others, through network link 578 and communications interface 570. In an example using the Internet 590, a server host 592 transmits program code for a particular application, requested by a message sent from computer 500, through Internet 590, ISP equipment 584, local network 580 and communications interface 570. The received code may be executed by processor 502 as it is received, or may be stored in memory 504 or in storage device 508 or any other non-volatile storage for later execution, or both. In this manner, computer system 500 may obtain application program code in the form of signals on a carrier wave.

Various forms of computer readable media may be involved in carrying one or more sequence of instructions or data or both to processor 502 for execution. For example, instructions and data may initially be carried on a magnetic disk of a remote computer such as host 582. The remote computer loads the instructions and data into its dynamic memory and sends the instructions and data over a telephone line using a modem. A modem local to the computer system 500 receives the instructions and data on a telephone line and uses an infra-red transmitter to convert the instructions and data to a signal on an infra-red carrier wave serving as the network link 578. An infrared detector serving as communications interface 570 receives the instructions and data carried in the infrared signal and places information representing the instructions and data onto bus 510. Bus 510 carries the information to memory 504 from which processor 502 retrieves and executes the instructions using some of the data sent with the instructions. The instructions and data received in memory 504 may optionally be stored on storage device 508, either before or after execution by the processor 502.

FIG. 6 illustrates a chip set or chip 600 upon which an embodiment of the invention may be implemented. Chip set 600 is programmed to provide real-time controlled location privacy as described herein and includes, for instance, the processor and memory components described with respect to FIG. 5 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 600 can be implemented in a single chip. It is further contemplated that in certain embodiments the chip set or chip 600 can be implemented as a single "system on a chip." It is further contemplated that in certain embodiments a separate ASIC would not be used, for example, and that all relevant functions as disclosed herein would be performed by a processor or processors. Chip set or chip 600, or a portion thereof, constitutes a means for performing one or more steps of providing user interface navigation information associated with the availability of functions. Chip set or chip 600, or a portion thereof, constitutes a means for performing one or more steps of providing real-time controlled location privacy.

In one embodiment, the chip set or chip 600 includes a communication mechanism such as a bus 601 for passing information among the components of the chip set 600. A processor 603 has connectivity to the bus 601 to execute instructions and process information stored in, for example, a memory 605. The processor 603 may include one or more processing cores with each core configured to perform independently. A multi-core processor enables multiprocessing within a single physical package. Examples of a multi-core processor include two, four, eight, or greater numbers of processing cores. Alternatively or in addition, the processor 603 may include one or more microprocessors configured in tandem via the bus 601 to enable independent execution of instructions, pipelining, and multithreading. The processor 603 may also be accompanied with one or more specialized components to perform certain processing functions and tasks such as one or more digital signal processors (DSP) 607, or one or more application-specific integrated circuits (ASIC) 609. A DSP 607 typically is configured to process real-world signals (e.g., sound) in real-time independently of the processor 603. Similarly, an ASIC 609 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 600 includes merely one or more processors and some software and/or firmware supporting and/or relating to and/or for the one or more processors.

The processor 603 and accompanying components have connectivity to the memory 605 via the bus 601. The memory 605 includes both dynamic memory (e.g., RAM, magnetic disk, writable optical disk, etc.) and static memory (e.g., ROM, CD-ROM, etc.) for storing executable instructions that when executed perform the inventive steps described herein to provide real-time controlled location privacy. The memory 605 also stores the data associated with or generated by the execution of the inventive steps.

Figure 7:
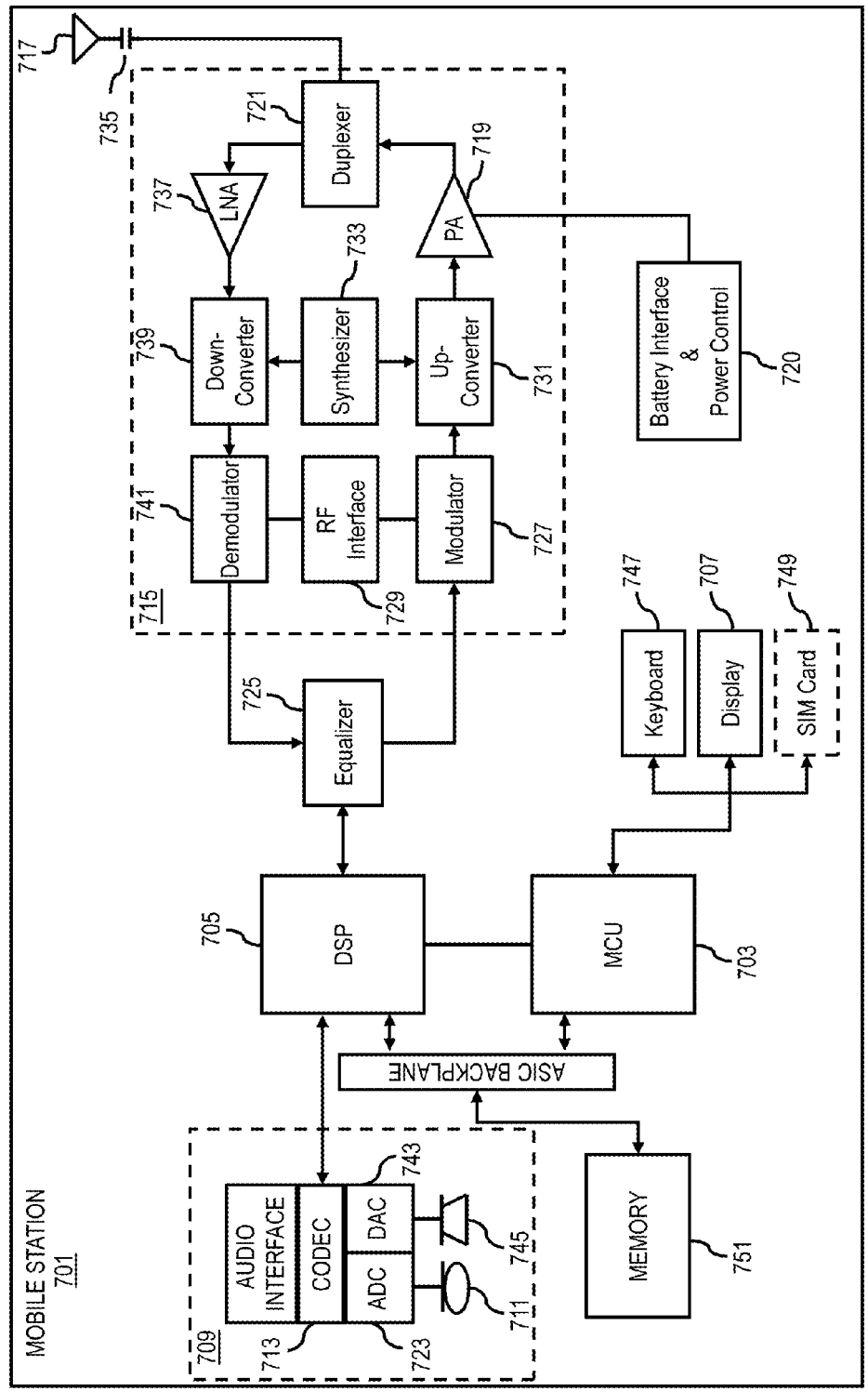
FIG. 7 is a diagram of a mobile terminal (e.g., handset) that can be used to implement an embodiment of the invention.

FIG. 7 is a diagram of exemplary components of a mobile terminal (e.g., handset) for communications, which is capable of operating in the system of FIG. 1, according to one embodiment. In some embodiments, mobile terminal 701, or a portion thereof, constitutes a means for performing one or more steps of providing real-time controlled location privacy. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 703, a Digital Signal Processor (DSP) 705, and a receiver/transmitter unit including a microphone gain control unit and a speaker gain control unit. A main display unit 707 provides a display to the user in support of various applications and mobile terminal functions that perform or support the steps of providing real-time controlled location privacy. The display 707 includes display circuitry configured to display at least a portion of a user interface of the mobile terminal (e.g., mobile telephone). Additionally, the display 707 and display circuitry are configured to facilitate user control of at least some functions of the mobile terminal. An audio function circuitry 709 includes a microphone 711 and microphone amplifier that amplifies the speech signal output from the microphone 711. The amplified speech signal output from the microphone 711 is fed to a coder/decoder (CODEC) 713.

A radio section 715 amplifies power and converts frequency in order to communicate with a base station, which is included in a mobile communication system, via antenna 717. The power amplifier (PA) 719 and the transmitter/modulation circuitry are operationally responsive to the MCU 703, with an output from the PA 719 coupled to the duplexer 721 or circulator or antenna switch, as known in the art. The PA 719 also couples to a battery interface and power control unit 720.

In use, a user of mobile terminal 701 speaks into the microphone 711 and his or her voice along with any detected background noise is converted into an analog voltage. The analog voltage is then converted into a digital signal through the Analog to Digital Converter (ADC) 723. The control unit 703 routes the digital signal into the DSP 705 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 725 for compensation of any frequency-dependent impairments that occur during transmission though the air such as phase and amplitude distortion. After equalizing the bit stream, the modulator 727 combines the signal with a RF signal generated in the RF interface 729. The modulator 727 generates a sine wave by way of frequency or phase modulation. In order to prepare the signal for transmission, an up-converter 731 combines the sine wave output from the modulator 727 with another sine wave generated by a synthesizer 733 to achieve the desired frequency of transmission. The signal is then sent through a PA 719 to increase the signal to an appropriate power level. In practical systems, the PA 719 acts as a variable gain amplifier whose gain is controlled by the DSP 705 from information received from a network base station. The signal is then filtered within the duplexer 721 and optionally sent to an antenna coupler 735 to match impedances to provide maximum power transfer. Finally, the signal is transmitted via antenna 717 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 701 are received via antenna 717 and immediately amplified by a low noise amplifier (LNA) 737. A down-converter 739 lowers the carrier frequency while the demodulator 741 strips away the RF leaving only a digital bit stream. The signal then goes through the equalizer 725 and is processed by the DSP 705. A Digital to Analog Converter (DAC) 743 converts the signal and the resulting output is transmitted to the user through the speaker 745, all under control of a Main Control Unit (MCU) 703 which can be implemented as a Central Processing Unit (CPU).

The MCU 703 receives various signals including input signals from the keyboard 747. The keyboard 747 and/or the MCU 703 in combination with other user input components (e.g., the microphone 711) comprise a user interface circuitry for managing user input. The MCU 703 runs a user interface software to facilitate user control of at least some functions of the mobile terminal 701 to provide real-time controlled location privacy. The MCU 703 also delivers a display command and a switch command to the display 707 and to the speech output switching controller, respectively. Further, the MCU 703 exchanges information with the DSP 705 and can access an optionally incorporated SIM card 749 and a memory 751. In addition, the MCU 703 executes various control functions required of the terminal. The DSP 705 may, depending upon the implementation, perform any of a variety of conventional digital processing functions on the voice signals. Additionally, DSP 705 determines the background noise level of the local environment from the signals detected by microphone 711 and sets the gain of microphone 711 to a level selected to compensate for the natural tendency of the user of the mobile terminal 701.

The CODEC 713 includes the ADC 723 and DAC 743. The memory 751 stores various data including call incoming tone data and is capable of storing other data including music data received via, e.g., the global Internet. The software module could reside in RAM memory, flash memory, registers, or any other form of writable storage medium known in the art. The memory device 751 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 749 carries, for instance, important information, such as the cellular phone number, the carrier supplying service, subscription details, and security information. The SIM card 749 serves primarily to identify the mobile terminal 701 on a radio network. The card 749 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising
   determining at least one location associated with at least one device based on at least one of a location-based service or sensor;
   determining one or more privacy metrics based on contextual information associated with at least one of the at least one location, the at least one device, or one or more applications associated with the at least one device, the one or more privacy metrics defining a measurable exposure of user data by the one or more applications executable on the device when the device is at the at least one location; and
   processing rules associated with the one or more privacy metrics to determine at least one recommended travel path among the at least one location, wherein processing the one or more privacy metrics comprises including one or more route detours in the at least one recommended travel path to preserve privacy by obtaining at least one of increased anonymity or a decreased sensitivity to locations associated with the detour relative to sensitivity to locations associated with an original travel path, and communicating the one or more route detours to the at least one device.

2. The method of claim 1, further comprising:
   re-determining and re-processing the at least one location, the contextual information, or a combination thereof in substantially real-time, periodically, according to a schedule, on demand, or a combination thereof; and
   an updating of the one or more privacy metrics based, at least on the re-determining and the re-processing.

3. The method of claim 2, further comprising:
   transforming the user data based at least on the one or more privacy metrics.

4. The method of claim 1, further comprising:
   determining at least one travel path associated with the at least one device; and
   processing the rules associated with the one or more privacy metrics to determine at least one recommended application for use on the at least one travel path.

5. The method of claim 1, further comprising:
   determining source information, accuracy information, use information, or a combination thereof of the user data by the one or more applications,
   wherein the contextual information includes, at least in part, the source information, the accuracy information, the use information, or a combination thereof.

6. The method of claim 5, further comprising:
   determining user sensitivity information for the at least one location,
   wherein the one or more privacy metrics are further based at least on the user sensitivity information.

7. The method of claim 1, further comprising:
   determining one or more threshold values for the one or more privacy metrics with respect to the one or more applications;
   evaluating the one or more privacy metrics against the one or more threshold values to determine whether to cause, at least (a) the exposure of the user data; (b) a transformation of the user data; (c) a selection of one or more privacy policies; (d) a presentation of one or more privacy alerts; or (e) a combination thereof.

8. The method of claim 1, further comprising:
   determining network information, connectivity information, or a combination thereof associated with the at least one location, the at least one device, or a combination thereof,
   wherein the one or more privacy metrics are further based at least on the network information, the connectivity information, or a combination thereof.

9. The method of claim 1, further comprising:
   associating the at least one location to one or more map tiles of a geographic map; and
   determining the one or more privacy metrics with respect to the one or more map tiles.

10. An apparatus comprising:
    at least one processor; and
    at least one memory including computer program code for one or more programs,
    the at least one memory and the computer program code configured to, with the at least one processor, cause the apparatus to perform at least the following:
    determine at least one location associated with at least one device based on at least one of a location-based service or sensor;
    determine one or more privacy metrics based on contextual information associated with at least one of the at least one location, the at least one device, or one or more applications associated with the at least one device, the one or more privacy metrics defining a measurable level of exposure of user data by the one or more applications executable on the device when the device is at the at least one location; and
    process rules associated with the one or more privacy metrics, to determine at least one recommended travel path among the at least one location, wherein processing the one or more privacy metrics comprises including one or more route detours in the at least one recommended travel path to preserve privacy by obtaining at least one of increased anonymity or a decreased sensitivity to locations associated with the detour relative to sensitivity to locations associated with an original travel paath, and communicating the one or more route detours to the at least one device.

11. The apparatus of claim 10, wherein the apparatus is further caused to:
    cause at least re-determining and re-processing of the at least one location, the contextual information, or a combination thereof in substantially real-time, periodically, according to a schedule, on demand, or a combination thereof; and
    cause, at least in part, an updating of the one or more privacy metrics based at least on the re-determining and the re-processing.

12. The apparatus of claim 11, wherein the apparatus is further caused to:
    cause at least a transformation of the user data based at least on the one or more privacy metrics.

13. The apparatus of claim 10, wherein the apparatus is further caused to:
    determine at least one travel path associated with the at least one device; and process the rules associated with the one or more privacy metrics, to determine at least one recommended application for use on the at least one travel path.

14. The apparatus of claim 10, wherein the apparatus is further caused to:
   determine source information, accuracy information, use information, or a combination thereof of the user data by the one or more applications,
   wherein the contextual information includes at least the source information, the accuracy information, the use information, or a combination thereof.

15. The apparatus of claim 14, wherein the apparatus is further caused to:
   determine user sensitivity information for the at least one location,
   wherein the one or more privacy metrics are further based at least on the user sensitivity information.

16. The apparatus of claim 10, wherein the apparatus is further caused to:
   determine one or more threshold values for the one or more privacy metrics with respect to the one or more applications;
   evaluate the one or more privacy metrics against the one or more threshold values to determine whether to cause at least (a) the exposure of the user data; (b) a transformation of the user data; (c) a selection of one or more privacy policies; (d) a presentation of one or more privacy alerts; or (e) a combination thereof.

17. The apparatus of claim 10, wherein the apparatus is further caused to:
   determine network information, connectivity information, or a combination thereof associated with the at least one location, the at least one device, or a combination thereof,
   wherein the one or more privacy metrics are further based, at least in part, on the network information, the connectivity information, or a combination thereof.

18. The apparatus of claim 10, wherein the apparatus is further caused to:
   associate the at least one location to one or more map tiles; and determine the one or more privacy metrics with respect to the one or more map tiles.

* * * * *

UNITED STATES PATENT AND TRADEMARK OFFICE
CERTIFICATE OF CORRECTION

Page 1 of 4

PATENT NO. : 10,146,956 B2
APPLICATION NO. : 13/465614
DATED : December 4, 2018
INVENTOR(S) : Boldyrev et al.

It is certified that error appears in the above-identified patent and that said Letters Patent is hereby corrected as shown below:

In the Claims

<u>Column 21, Line 13 through Column 24, Line 21</u>:
Delete the claim set, and substitute therefore the claim set as shown.

1. A method comprising
    receiving, from at least one device, at least one location associated with the at least one device based on at least one of a location-based service or sensor;
    monitoring contextual information associated with at least one of the at least one location, the at least one device, or one or more applications associated with the at least one device to determine one or more privacy metrics, the one or more privacy metrics defining a measurable exposure of user data by the one or more applications executable on the device when the device is at the at least one location; and
    applying rules associated with the one or more privacy metrics to compute at least one recommended travel path among the at least one location, wherein the at least one recommended travel path includes one or more route detours in the at least one recommended travel path to preserve privacy by obtaining at least one of increased anonymity or a decreased sensitivity to locations associated with the detour relative to sensitivity to locations associated with an original travel path, and communicating, via a communication network, the one or more route detours to the at least one device so as to facilitate control of location privacy.

2. The method of claim 1, further comprising:
    monitoring the at least one location, the contextual information, or a combination thereof in substantially real-time, periodically, according to a schedule, on demand, or a combination thereof; and
    an updating of the one or more privacy metrics based, at least on the monitoring.

3. The method of claim 2, further comprising:
    transforming the user data based at least on the one or more privacy metrics.

Signed and Sealed this
Fifteenth Day of October, 2019

Andrei Iancu
*Director of the United States Patent and Trademark Office*

4. The method of claim 1, further comprising:
    computing at least one travel path associated with the at least one device; and
    applying the rules associated with the one or more privacy metrics to determine at least one recommended application for use on the at least one travel path.

5. The method of claim 1, further comprising:
    determining source information, accuracy information, use information, or a combination thereof of the user data by the one or more applications,
    wherein the contextual information includes, at least in part, the source information, the accuracy information, the use information, or a combination thereof.

6. The method of claim 5, further comprising:
    determining user sensitivity information for the at least one location,
    wherein the one or more privacy metrics are further based at least on the user sensitivity information.

7. The method of claim 1, further comprising:
    determining one or more threshold values for the one or more privacy metrics with respect to the one or more applications;
    evaluating the one or more privacy metrics against the one or more threshold values to determine whether to cause, at least (a) the exposure of the user data; (b) a transformation of the user data; (c) a selection of one or more privacy policies; (d) a presentation of one or more privacy alerts; or (e) a combination thereof.

8. The method of claim 1, further comprising:
    determining network information, connectivity information, or a combination thereof associated with the at least one location, the at least one device, or a combination thereof,
    wherein the one or more privacy metrics are further based at least on the network information, the connectivity information, or a combination thereof.

9. The method of claim 1, further comprising:
    associating the at least one location to one or more map tiles of a geographic map; and
    determining the one or more privacy metrics with respect to the one or more map tiles.

10. An apparatus comprising:
    at least one processor; and
    at least one memory including computer program code for one or more programs,
    the at least one memory and the computer program code configured to, with the at least one processor, cause the apparatus to perform at least the following:
    receive, from at least one device, at least one location associated with at least one device based on at least one of a location-based service or sensor;
    monitor contextual information associated with at least one of the at least one location, the at least one device, or one or more applications associated with the at least one device to determine one or more privacy metrics, the one or more privacy metrics defining a measurable level of exposure of user data by the one or more applications executable on the device when the device is at the at least one location; and apply rules associated with the one or more privacy metrics, to compute at least one recommended travel path among the at least one location, wherein the at least one recommended travel path includes one or more route detours in the at least one recommended travel path to preserve privacy by obtaining at least one of increased anonymity or a decreased sensitivity to locations associated with the detour relative to sensitivity to locations associated with an original travel path, and communicating, via a communication network, the one or more route detours to the at least one device so as to facilitate control of location privacy.

11. The apparatus of claim 10, wherein the apparatus is further caused to:
   cause monitoring of the at least one location, the contextual information, or a combination thereof in substantially real-time, periodically, according to a schedule, on demand, or a combination thereof; and
   cause, at least in part, an updating of the one or more privacy metrics based at least on the monitoring.

12. The apparatus of claim 11, wherein the apparatus is further caused to:
   cause at least a transformation of the user data based at least on the one or more privacy metrics.

13. The apparatus of claim 10, wherein the apparatus is further caused to:
   compute at least one travel path associated with the at least one device; and
   apply the rules associated with the one or more privacy metrics, to determine at least one recommended application for use on the at least one travel path.

14. The apparatus of claim 10, wherein the apparatus is further caused to:
   determine source information, accuracy information, use information, or a combination thereof of the user data by the one or more applications,
   wherein the contextual information includes at least the source information, the accuracy information, the use information, or a combination thereof.

15. The apparatus of claim 14, wherein the apparatus is further caused to:
   determine user sensitivity information for the at least one location,
   wherein the one or more privacy metrics are further based at least on the user sensitivity information.

16. The apparatus of claim 10, wherein the apparatus is further caused to:
   determine one or more threshold values for the one or more privacy metrics with respect to the one or more applications;
   evaluate the one or more privacy metrics against the one or more threshold values to determine whether to cause at least (a) the exposure of the user data; (b) a transformation of the user data; (c) a selection of one or more privacy policies; (d) a presentation of one or more privacy alerts; or (e) a combination thereof.

17. The apparatus of claim 10, wherein the apparatus is further caused to:

determine network information, connectivity information, or a combination thereof associated with the at least one location, the at least one device, or a combination thereof,
wherein the one or more privacy metrics are further based, at least in part, on the network information, the connectivity information, or a combination thereof.

18. The apparatus of claim 10, wherein the apparatus is further caused to:
associate the at least one location to one or more map tiles; and determine the one or more privacy metrics with respect to the one or more map tiles.